(12) United States Patent
Baker et al.

(10) Patent No.: US 9,300,522 B2
(45) Date of Patent: Mar. 29, 2016

(54) INFORMATION TECHNOLOGY ASSET MANAGEMENT

(75) Inventors: Ronald B. Baker, Wake Forest, NC (US); Ling-Ching W. Tai, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1355 days.

(21) Appl. No.: 12/645,941

(22) Filed: Dec. 23, 2009

(65) Prior Publication Data

US 2011/0153787 A1 Jun. 23, 2011

(51) Int. Cl.
*G06F 15/177* (2006.01)
*H04L 29/12* (2006.01)

(52) U.S. Cl.
CPC ...... *H04L 29/12801* (2013.01); *H04L 61/6004* (2013.01)

(58) Field of Classification Search
USPC .......................................................... 709/221
See application file for complete search history.

(56) References Cited

U.S. PATENT DOCUMENTS

| | | | | |
|---|---|---|---|---|
| 5,526,358 A | * | 6/1996 | Gregerson et al. ............ | 709/221 |
| 5,548,722 A | * | 8/1996 | Jalalian et al. ................ | 709/220 |
| 5,630,051 A | | 5/1997 | Sun et al. | |
| 5,703,885 A | | 12/1997 | Sun et al. | |
| 5,717,921 A | | 2/1998 | Lomet et al. | |
| 5,878,431 A | | 3/1999 | Potterveld et al. | |
| 6,004,027 A | | 12/1999 | Sun et al. | |
| 6,282,681 B1 | | 8/2001 | Sun et al. | |
| 6,889,275 B2 | | 5/2005 | Vandecappelle et al. | |
| 7,222,119 B1 | * | 5/2007 | Ghemawat et al. ........... | 1/1 |
| 7,428,546 B2 | * | 9/2008 | Nori et al. ..................... | 1/1 |
| 2002/0087665 A1 | * | 7/2002 | Marshall et al. ............. | 709/220 |
| 2005/0278339 A1 | * | 12/2005 | Petev et al. .................... | 707/10 |
| 2007/0183421 A1 | * | 8/2007 | Terrell et al. ................. | 370/389 |
| 2007/0220513 A1 | | 9/2007 | Hwang | |
| 2008/0079724 A1 | | 4/2008 | Isard et al. | |
| 2011/0173251 A1 | * | 7/2011 | Sandhu et al. ............... | 709/203 |

OTHER PUBLICATIONS

Terveen-et al.; "Constructing, Organizing, and Visualizing Collections of Topically Related Web Resources"; ACM Digital Library; vol. 6, No. 1, pp. 67-94, Mar. 1999.

Attie-et al.; "Synthesis of Concurrent Systems with Many Similar Processes"; ACM Digital Library; V 20, No. 1, pp. 51-115, Jan. 1998.

Kun He-et al.•, "A new task duplication based multitask scheduling method"; Dialog/Inspec; Oct. 21-23, 2006.

Gal et al., "A Framework for Modeling and Evaluating Automatic Semantic Reconciliation", The VLDB Journal, 2005, vol. 14, pp. 50-67.

(Continued)

*Primary Examiner* — Blake Rubin
(74) *Attorney, Agent, or Firm* — Ido Tuchman; William J. Stock

(57) ABSTRACT

In an embodiment, a system for information technology asset management may include a plurality of data processing systems, and a network connecting the plurality of data processing systems. The system may also include a controller configured to manage the plurality of data processing systems by resolving naming conflicts for each of the plurality of data processing systems on the network to a respective master name while also maintaining the alias names for each of the plurality of data processing systems on the network.

25 Claims, 12 Drawing Sheets

| CDM Class | Old Master | New Master | Timestamp |
|---|---|---|---|
| ComputerSystem | UUID1 | MMS1 | |
| OperatingSystem | UUID1/AIX 5.1 | MMS1/AIX 5.1 | |
| OperatingSystem | UUID1/WinXP | MMS1/WinXP | |
| SofwareInstallation | UUID1/AIX 5.1/DB2 | MMS1/AIX 5.1/DB2 | |
| SofwareInstallation | UUID1/AIX 5.1/WAS | MMS1/AIX 5.1/WAS | |
| SofwareInstallation | UUID/WinXP/Firewall | MMS1/WinXP/Firewall | |

20

(56) References Cited

OTHER PUBLICATIONS

Lueh et al., "Fusion-Based Register Allocation", ACM Transactions on Programming Languages and Systems, vol. 22, No. 3, May 2000, pp. 431-470.

Ives et al., "The Orchestra Collaborative Data Sharing System", SIGMOD Record, Sep. 2008, vol. 37, No. 3, pp. 26-32.

Terveen et al., "Constructing, Organizing, and Visualizing Collections of Topically Related Web Resources", ACM Digital Library, vol. 6, No. 1, Mar. 1999, pp. 67-94.

Attie et al., "Synthesis of Concurrent Systems with Many Similar Processes", ACM Digital Library, vol. 20, No. 1, Jan. 1998, pp. 51-115.

Kun He et al., "A New Task Duplication Based Multitask Scheduling Method", Dialog/Inspec., Oct. 2006, pp. 21-23.

* cited by examiner

| CDM Class | Old Master | New Master | Timestamp |
|---|---|---|---|
| ComputerSystem | UUID1 | MMS1 | |
| OperatingSystem | UUID1/AIX 5.1 | MMS1/AIX 5.1 | |
| OperatingSystem | UUID1/WinXP | MMS1/WinXP | |
| SofwareInstallation | UUID1/AIX 5.1/DB2 | MMS1/AIX 5.1/DB2 | |
| SofwareInstallation | UUID1/AIX 5.1/WAS | MMS1/AIX 5.1/WAS | |
| SofwareInstallation | UUID/WinXP/Firewall | MMS1/WinXP/Firewall | |

INFORMATION TECHNOLOGY ASSET MANAGEMENT

BACKGROUND

Information technology is generally considered to encompass all facets related to software, firmware, and/or hardware used for information processing, management, and/or the like. The software, firmware, and/or hardware resources may be referred to as assets. Information technology assets have value like any other resources and therefore a number of systems have been developed to manage such.

SUMMARY

According to an embodiment of the invention, a system to improve information technology asset management may include a plurality of data processing systems, and a communication network connecting the plurality of data processing systems. The system may also include a controller configured to manage the plurality of data processing systems by resolving naming conflicts for each of the plurality of data processing systems on the communication network to a respective master name while also maintaining the alias names for each of the plurality of data processing systems on the communication network.

The controller may determine the master name and any alias name for each of the plurality of data processing systems on the communication network. The controller may distribute each respective master name for each of the plurality of data processing systems on the communication network to the other data processing systems on the communication network.

The controller may resolve the naming conflict by correlating all names for each of the plurality of data processing systems on the communication network into a table. The table may comprise a naming rule, an alias name, and/or a master name. The controller may use the table to build a tree to converge naming conflicts into each respective master name for each of the plurality of data processing systems on the communication network.

The controller may comprise a plurality of controllers. The information from the plurality of controllers may be cross-referenced to determine the respective master name for each of the plurality of data processing systems on the communication network. The controller may select the respective master name based upon a policy choice and/or configurable choice.

An embodiment of the invention is a method for information technology asset management. The method may include managing a plurality of data processing systems on a communication network by resolving naming conflicts for each of the plurality of data processing systems on the communication network to a respective master name via an automated system. The method may also include maintaining the alias names for each of the plurality of data processing systems on the communication network.

The method may further include determining the master name and any alias name for each of the plurality of data processing systems on the communication network. The method may additionally include resolving the naming conflict by correlating all names for each of the plurality of data processing systems on the communication network into a table.

The method may further include using the table to build a tree to converge naming conflicts into each respective master name for each of the plurality of data processing systems on the communication network. The method may additionally include distributing the respective master name for each of the plurality of data processing systems on the communication network to the other data processing systems on the communication network.

The method may further include cross-referencing information from throughout the automated system to determine the respective master name for each of the plurality of data processing systems on the communication network. The method may additionally include selecting the respective master name based upon at least one of a policy choice and configurable choice.

In an embodiment, the system may include a plurality of data processing systems, and a communication network connecting the plurality of data processing systems. The system may also include a controller configured to manage the plurality of data processing systems by resolving naming conflicts for each of the plurality of data processing systems on the communication network to a respective master name based upon at least one of a policy choice and configurable choice while also maintaining the alias names for each of the plurality of data processing systems on the communication network. The controller may resolve the naming conflict by correlating all names for each of the plurality of data processing systems on the communication network into a table.

In an embodiment, the system may include a plurality of data processing systems, and a communication network connecting the plurality of data processing systems. The system may also include a controller configured to manage the plurality of data processing systems by resolving naming conflicts for each of the plurality of data processing systems on the communication network to a respective master name based upon at least one of a policy choice and configurable choice while also maintaining the alias names for each of the plurality of data processing systems on the communication network. The controller may determine each respective master name and any alias name for each of the plurality of data processing systems on the communication network. The controller may distribute each respective master name for each of the plurality of data processing systems on the communication network to the other data processing systems on the communication network. The controller may resolve the naming conflict by correlating all names for each of the plurality of data processing systems on the communication network into a table.

BRIEF DESCRIPTION OF THE DRAWINGS

FIG. 5 is a table in accordance with an embodiment of the invention.

DETAILED DESCRIPTION

Embodiments of the invention will now be described more fully hereinafter with reference to the accompanying drawings, in which embodiments of the invention are shown. Like numbers refer to like elements throughout, like numbers with letter suffixes are used to identify similar parts in a single embodiment, letter suffix lower case z indicates any unused letter or combination of letters, and prime notations are used to indicate similar and/or identical elements as understood from different viewpoints.

Figure 1:
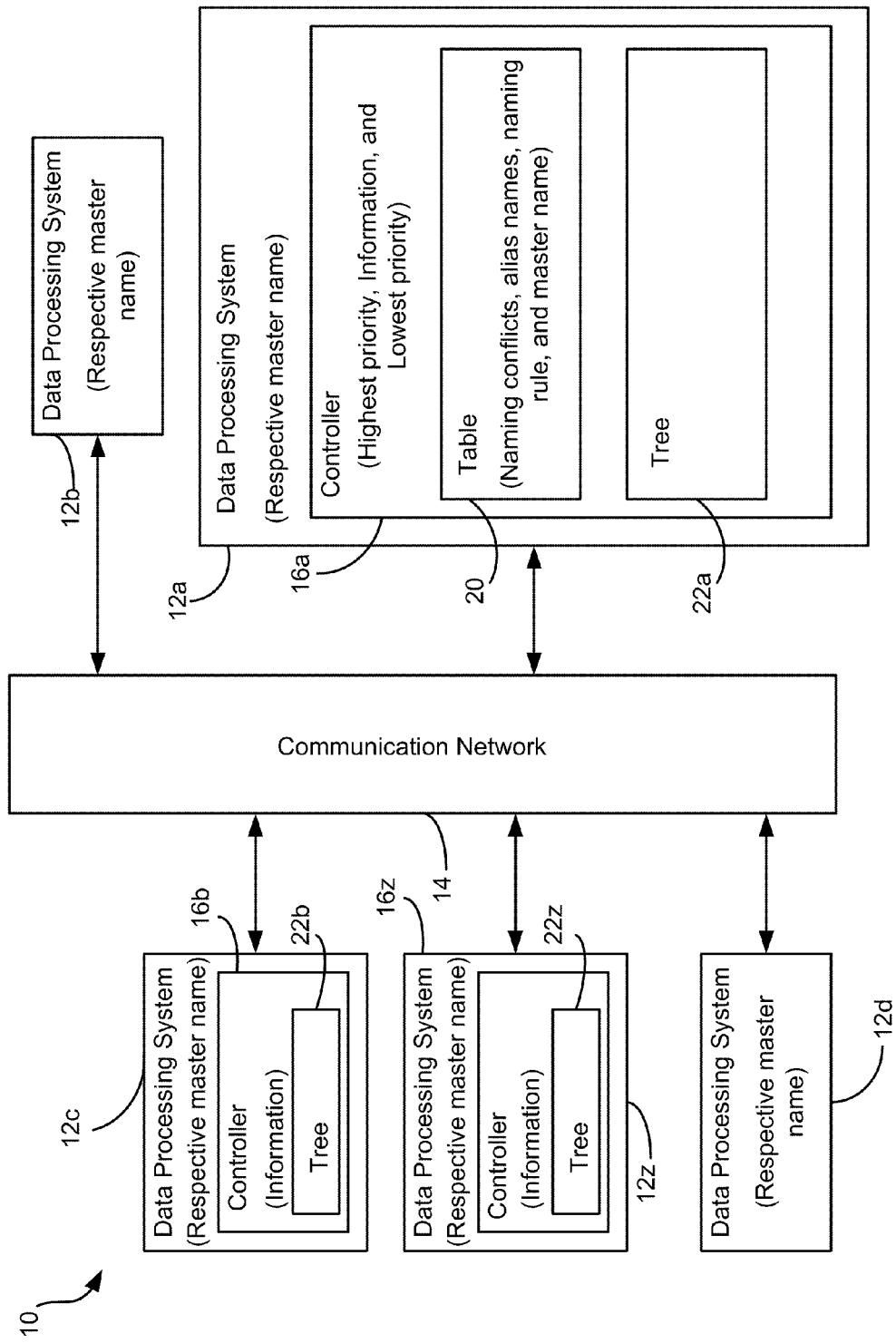
FIG. 1 is a schematic block diagram of a system to improve information technology asset management in accordance with an embodiment of the invention.

With reference now to FIG. 1, a system 10 for information technology asset, e.g. a network of computers, management is initially described. In an embodiment, the system 10 includes a plurality of data processing systems 12a-12z. The data processing systems 12a-12z are computers, signal processing circuitry, and/or the like, for instance. The system includes a communication network 14 connecting the plurality of data processing systems 12a-12z. In an embodiment, the communication network 14 enables a signal to travel anywhere within system 10 and/or to any other system connected to system 10. The communication network 14 is wired and/or wireless, for example. The communications network 14 is local and/or global with respect to system 10, for instance.

In an embodiment, the system 10 also includes a controller 16a configured to manage the plurality of data processing systems 12a-12z by resolving naming conflicts for each of the plurality of data processing systems on the communication network 14 to a respective master name while also maintaining the alias names for each of the plurality of data processing systems on the communication network. In an embodiment, the controller 16a is implemented in software, firmware, hardware, and/or the like.

In an embodiment, the controller 16a determines each respective master name and any alias name for each of the plurality of data processing systems 12a-12z on the communication network 14. For example, the controller 16a uses naming rule priority to determine which one of the plurality of data processing systems 12a-12z is the master and which ones are the aliases. In an embodiment, the controller 16a distributes each respective master name for each of the plurality of data processing systems 12a-12z on the communication network 14 to the other data processing systems on the communication network.

In an embodiment, the controller 16a resolves the naming conflict by correlating all names for each of the plurality of data processing systems 12a-12z on the communication network 14 into a table 20. In an embodiment, the table 20 comprises a naming rule, an alias name, and/or a master name. In an embodiment, the controller 16a uses the table 20 to build a tree 22a-22z to converge naming conflicts into each respective master name for each of the plurality of data processing systems 12a-12z on the communication network 14.

In an embodiment, the controller 16a comprises a plurality of controllers 16a-16z. In an embodiment, the information from the plurality of controllers 16a-16z are cross-referenced to determine the respective master name for each of the plurality of data processing systems 12a-12z on the communication network 14. In an embodiment, the controller 16a-16z selects the respective master name based upon a policy choice and/or configurable choice.

Figure 6:
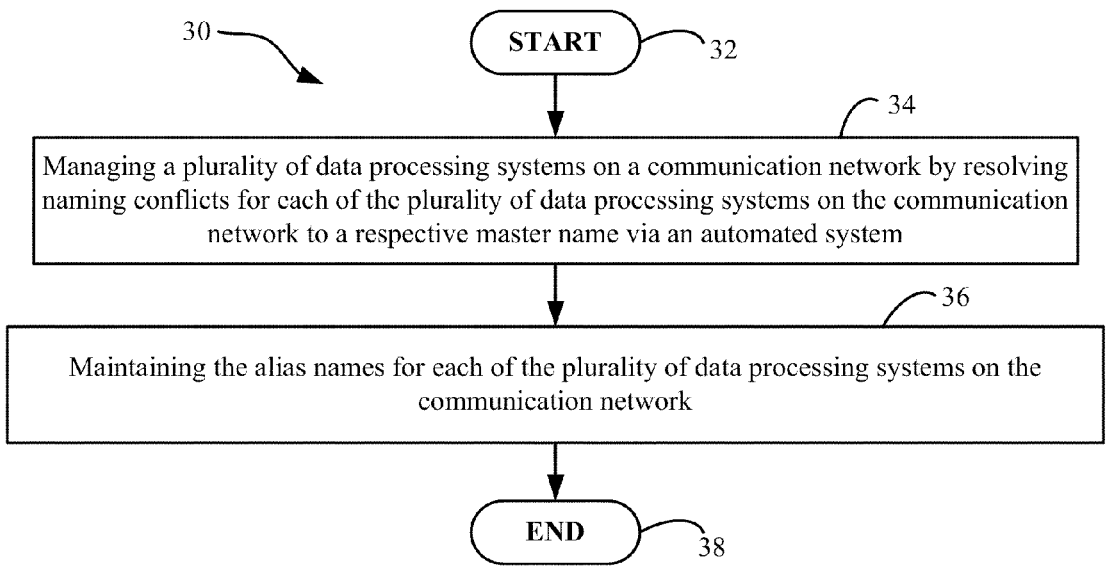
FIG. 6 is a flowchart illustrating a method according to an embodiment of the invention.

A method for information technology asset management is described with reference to flowchart 30 of FIG. 6. The method begins at Block 32 and includes managing a plurality of data processing systems on a communication network by resolving naming conflicts for each of the plurality of data processing systems on the communication network to a respective master name via an automated system at Block 34. The method also includes maintaining the alias names for each of the plurality of data processing systems on the communication network at Block 36. The method ends at Block 38.

Figure 7:
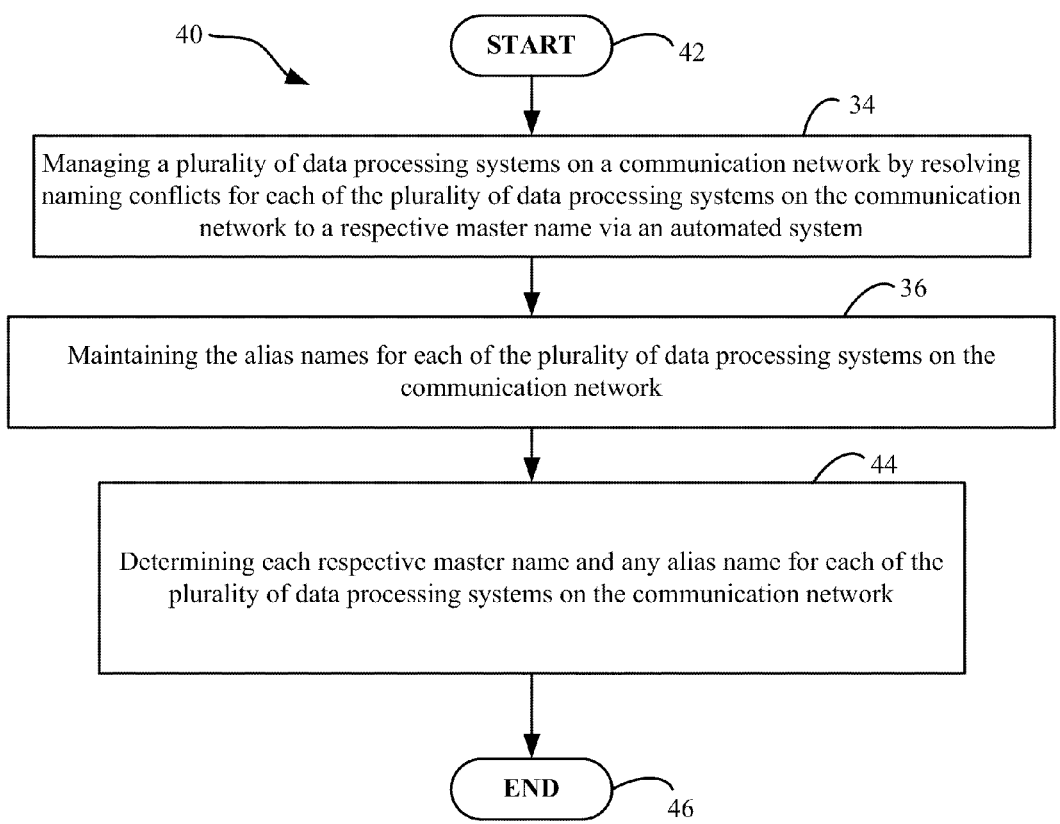
FIG. 7 is a flowchart according to the method of FIG. 6.

In another method embodiment, which is now described with reference to flowchart 40 of FIG. 7, the method begins at Block 42. The method may include the steps of FIG. 6 at Blocks 34 and 36. The method may additionally include determining each respective master name and lower priority to any alias name for each of the plurality of data processing systems on the communication network at Block 44. The method ends at Block 46.

Figure 8:
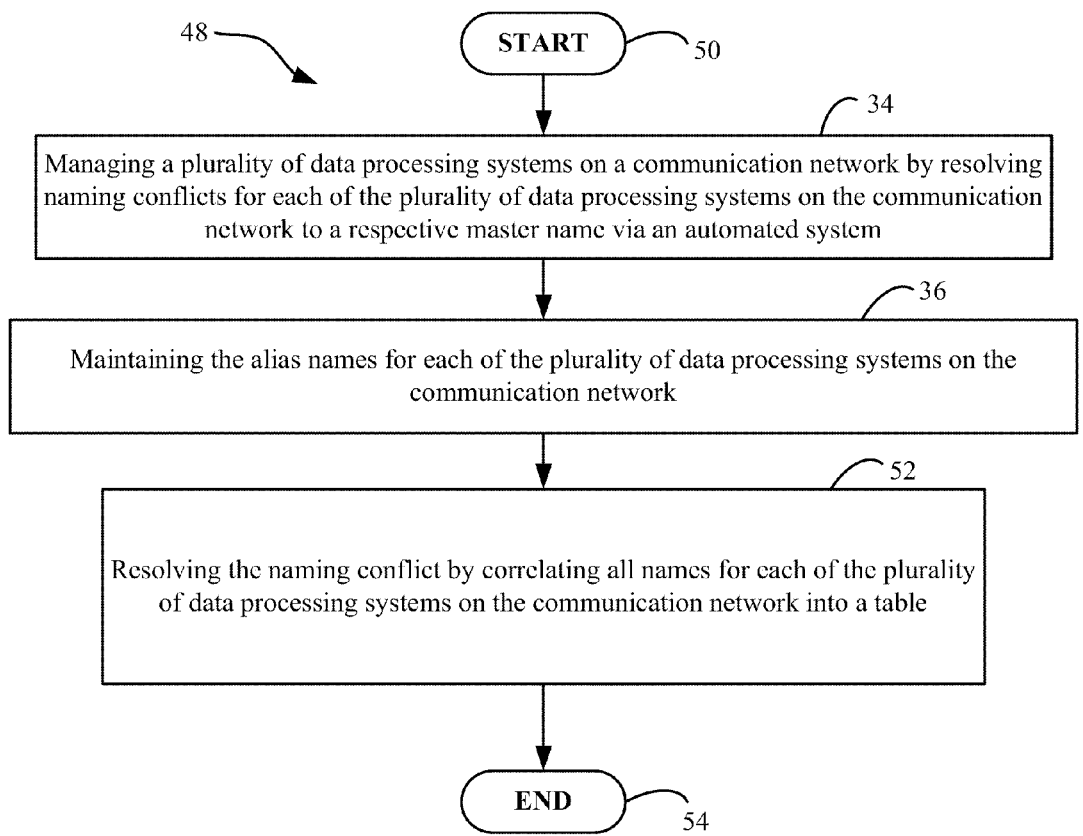
FIG. 8 is a flowchart according to the method of FIG. 6.

In another method embodiment, which is now described with reference to flowchart 48 of FIG. 8, the method begins at Block 50. The method may include the steps of FIG. 6 at Blocks 34 and 36. The method may additionally include resolving the naming conflict by correlating all names for each of the plurality of data processing systems on the communication network into a table at Block 52. The method ends at Block 54.

Figure 9:
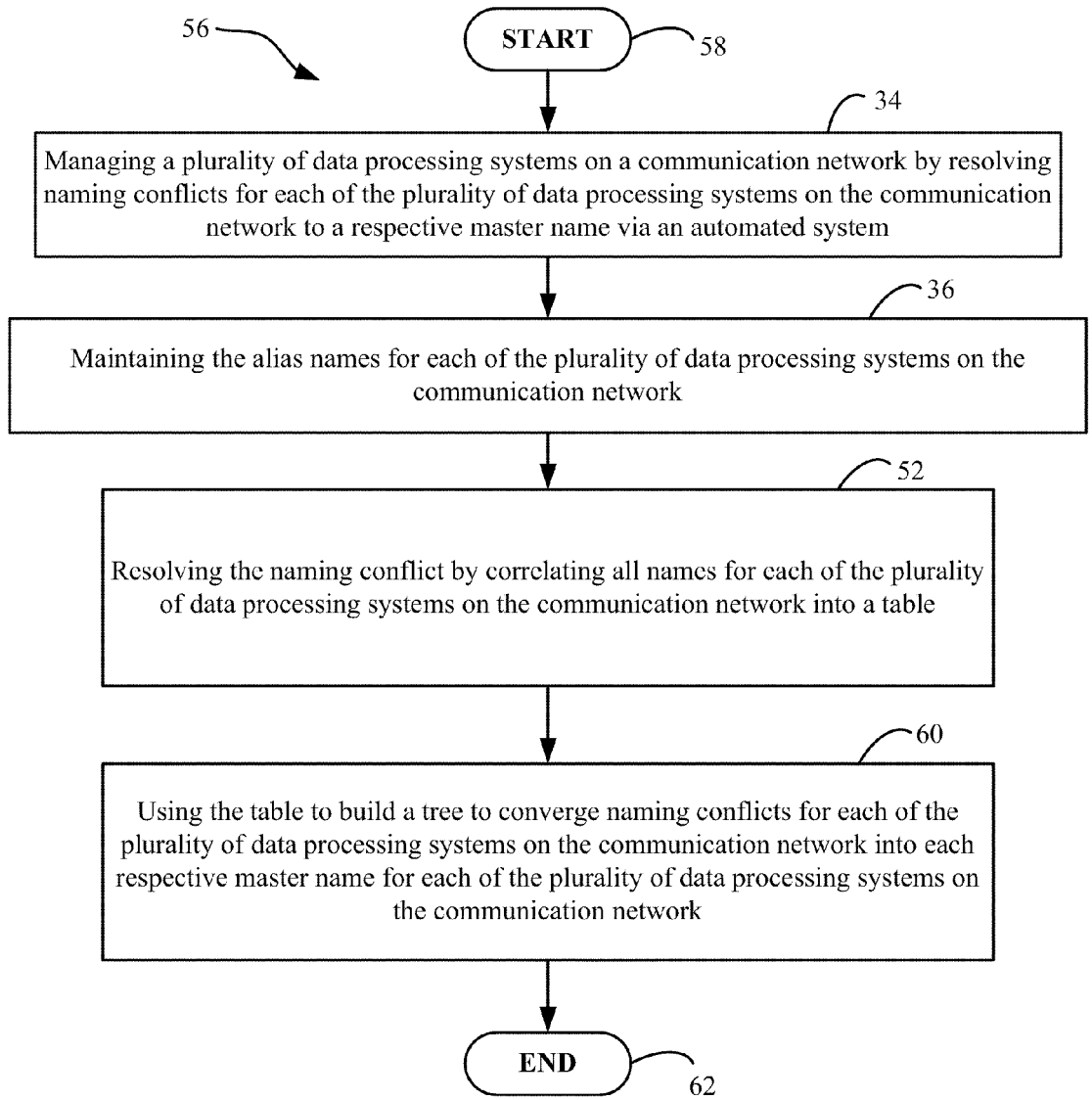
FIG. 9 is a flowchart according to the method of FIG. 8.

In another method embodiment, which is now described with reference to flowchart 56 of FIG. 9, the method begins at Block 58. The method may include the steps of FIG. 8 at Blocks 34, 36, and 52. The method may additionally include using the table to build a tree to converge naming conflicts for each of the plurality of data processing systems on the communication network into each respective master name for each of the plurality of data processing systems on the communication network at Block 60. The method ends at Block 62.

Figure 10:
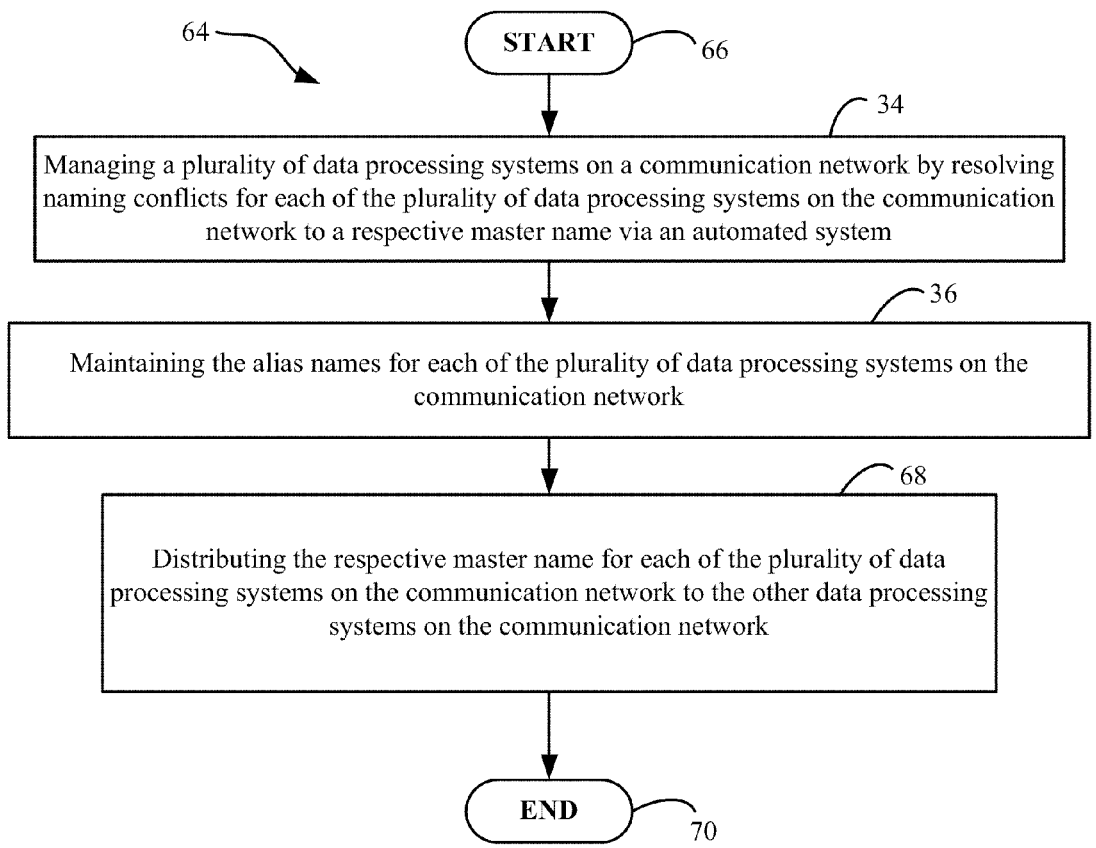
FIG. 10 is a flowchart according to the method of FIG. 6.

In another method embodiment, which is now described with reference to flowchart 64 of FIG. 10, the method begins at Block 66. The method may include the steps of FIG. 6 at Blocks 34 and 36. The method may additionally include distributing the respective master name for each of the plurality of data processing systems on the communication network to the other data processing systems on the communication network at Block 68. The method ends at Block 70.

Figure 11:
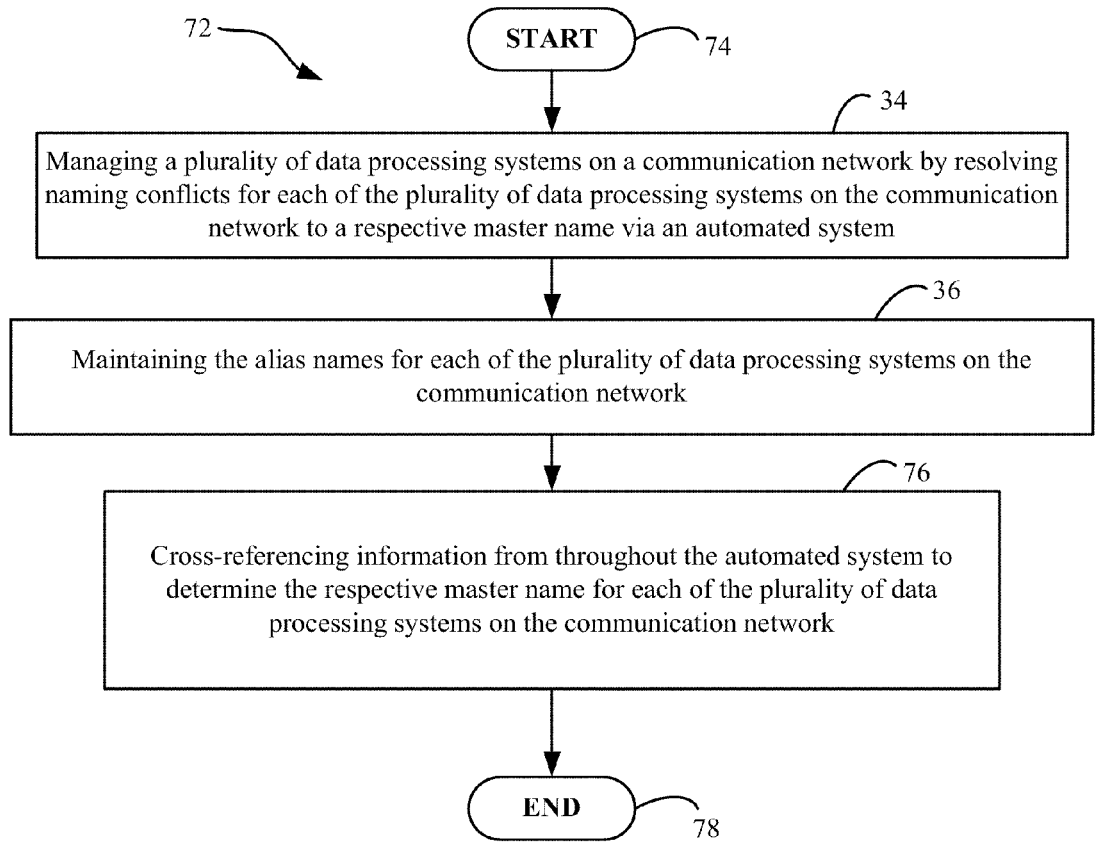
FIG. 11 is a flowchart according to the method of FIG. 6.

In another method embodiment, which is now described with reference to flowchart 72 of FIG. 11, the method begins at Block 74. The method may include the steps of FIG. 6 at Blocks 34 and 36. The method may additionally include cross-referencing information from throughout the automated system to determine the respective master name for each of the plurality of data processing systems on the communication network at Block 76. The method ends at Block 78.

Figure 12:
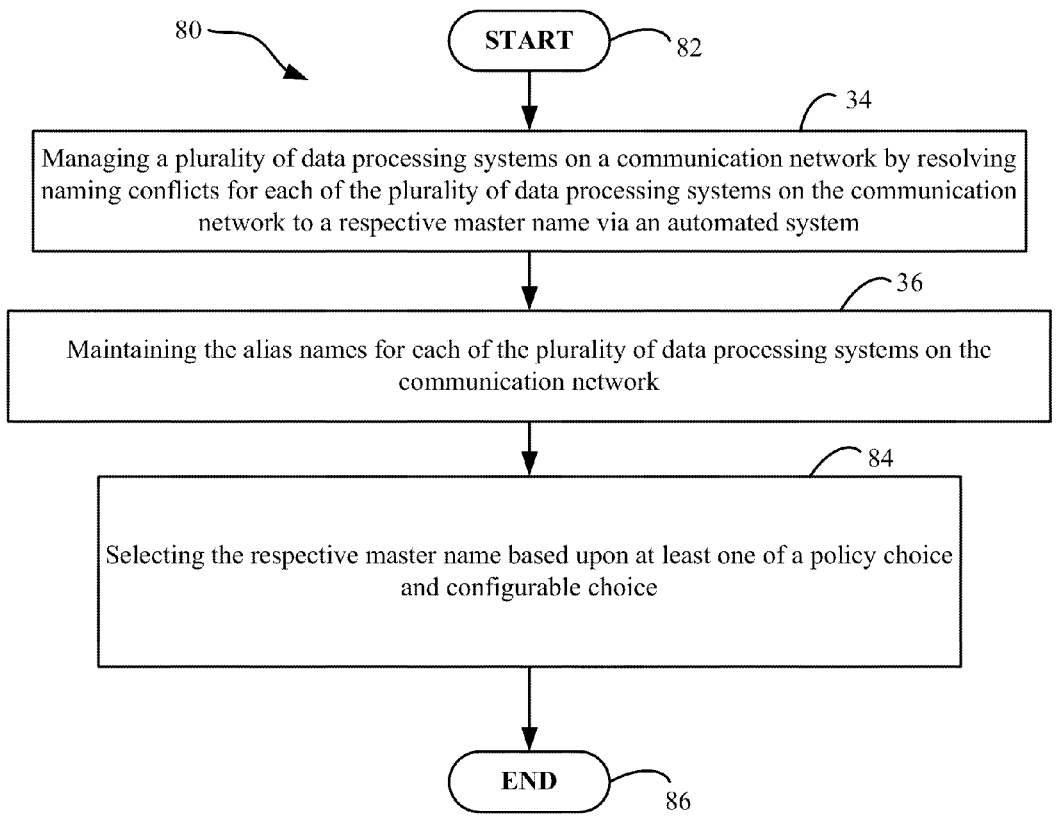
FIG. 12 is a flowchart illustrating according to the method of FIG. 6.

In another method embodiment, which is now described with reference to flowchart 80 of FIG. 12, the method begins at Block 82. The method may include the steps of FIG. 6 at Blocks 34 and 36. The method may additionally include selecting the respective master name based upon at least one of a policy choice and configurable choice at Block 84. The method ends at Block 86.

In an embodiment, the system 10 includes a plurality of data processing systems 12a-12z, and a communication network 14 connecting the plurality of data processing systems. The system also includes a controller 16a configured to manage the plurality of data processing systems 12a-12z by resolving naming conflicts for each of the plurality of data processing systems on the communication network 14 to a respective master name based upon at least one of a policy choice and configurable choice while also maintaining the alias names for each of the plurality of data processing systems on the communication network. The controller 16a resolves the naming conflict by correlating all names for each of the plurality of data processing systems 12a-12z on the communication network 14 into a table 20.

In an embodiment, the system 10 includes a plurality of data processing systems 12a-12z, and a communication network 14 connecting the plurality of data processing systems. The system 10 also includes a controller 16a configured to manage the plurality of data processing systems 12a-12z by resolving naming conflicts for each of the plurality of data processing systems on the communication network 14 to a respective master name based upon at least one of a policy choice and configurable choice while also maintaining the alias names for each of the plurality of data processing systems on the communication network. The controller 16a determines each respective master name and any alias name for each of the plurality of data processing systems 12a-12z on the communication network 14. The controller 16a distributes the respective master name for each of the plurality of data processing systems 12a-12z on the communication network 14 to the other data processing systems on the communication network. The controller 16a resolves the naming conflict by correlating all names for each of the plurality of data processing systems 12a-12z on the communication network 14 into a table 20.

In view of the foregoing, the system 10 manages information technology assets. For instance, some information technology asset management products can identify the same resource, e.g. each data processing system on a communication network, differently in many cases because of identity problems.

Figure 2:
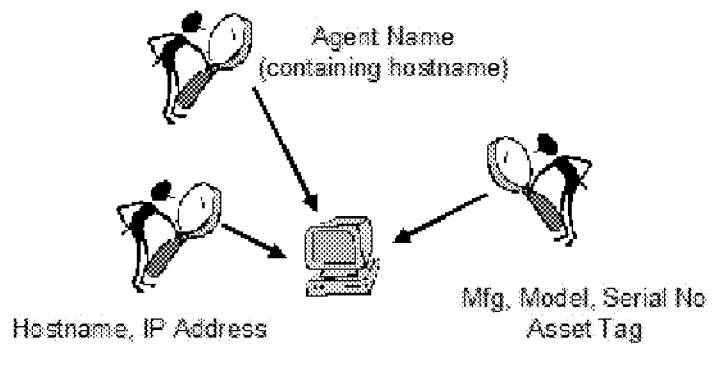
FIG. 2 is a schematic block diagram of an identity issue in accordance with an embodiment.

With additional reference to FIG. 2, a network scan knows the computer system differently than the asset system, and the monitoring system knows the hostname, but embeds it into an agent identifier string, for example. The hostname is generally okay for static servers, but not reliable for desktops, hot fail-over standby machines, and increasing virtualization. In addition, Internet Protocol Address is not reliable due to the Dynamic Host Configuration Protocol, and Manufacturer-Model-and-Serial-number ("MMS") is highly dependent on the vendors.

The Common Data Model ("CDM") outlines the different "naming rules" to identify each resource, e.g. each data processing systems. These rules become a contract between products to agree on what attributes to provide, and how to provide them. Once attributes can be matched, the different views of the resource can be reconciled together, so you know they are referring to the same resource.

The Naming Reconciliation Service ("NRS"), e.g. controller 16a-16z, allows products to register a resource by giving it's agreed to CDM class, and the attributes it knows about, and receive an identifier of the master name back. A resource may have multiple names based on the naming rules. However, only one is the master, the rest are aliases. The NRS can maintain the mapping, aliases, and link them all together.

The CDM naming rules list the attributes that provide identifying characteristics, what combination of attributes are needed to identify the resource, and what the context is that makes that identification unique. For example, there might be a rule that combines "Manufacturer", "Model", and "Serial-Number", e.g. MMS, to give a unique identification of a machine. Or, the operating system ("OS") name of an OS can provide a unique identification of the operating system within the context of a computer system.

The naming rule of an operating system uses the master name of a computer system as the naming context. The unique identification of an object may require one, or multiple, naming contexts.

During reconciliation, if NRS, e.g. controller 16a-16z, detects duplicates, e.g. same resource has been registered multiple times with different identities, it will converge these different identities by selecting one as the master, and the rest as aliases. In converging duplicates, a master may become an alias of the newly selected master. All the resources, e.g. data processing system 12a-12z, using this old master name as the naming context should be changed.

A duplicate resource sub-graph problem can occur for a number of reasons. For instance, when multiple input sources discover a resource and its dependents, but use different identifying attributes. Then a third source provides information that matches both. Or when multiple input sources originally discover a resource and its dependents with different identifying attributes, but later are able to obtain additional attributes that match the other source. Or when input sources focus on different parts of the sub-graph for their solution thereby causing disjoint sub-graph sets.

Figure 3:
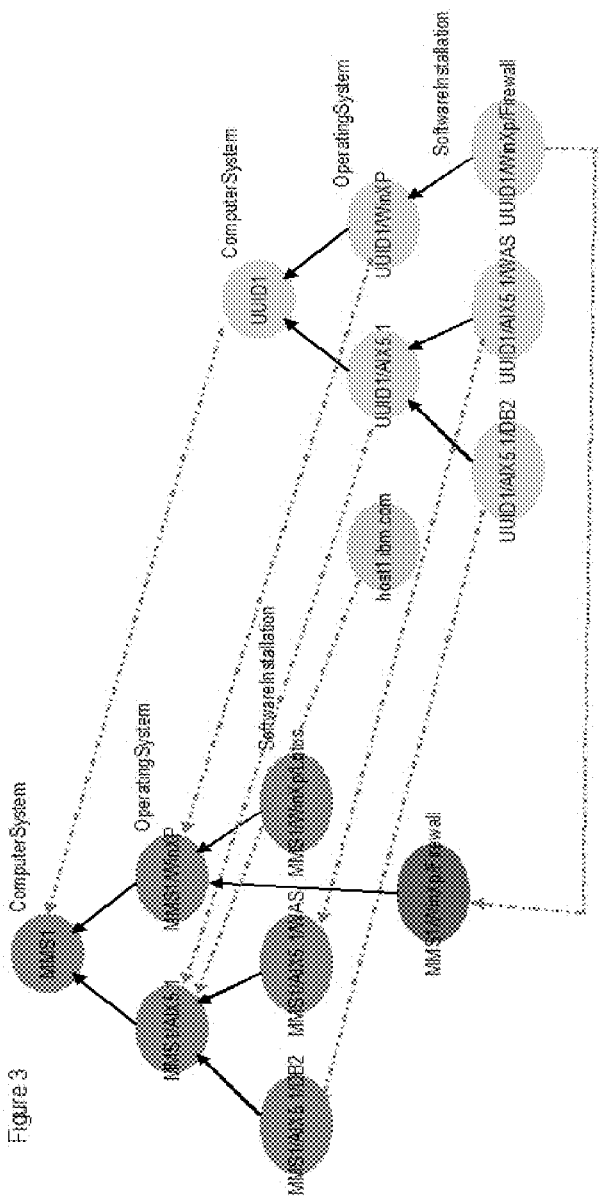
FIG. 3 is a diagram of an identity issue tree in accordance with an embodiment.
Figure 4:
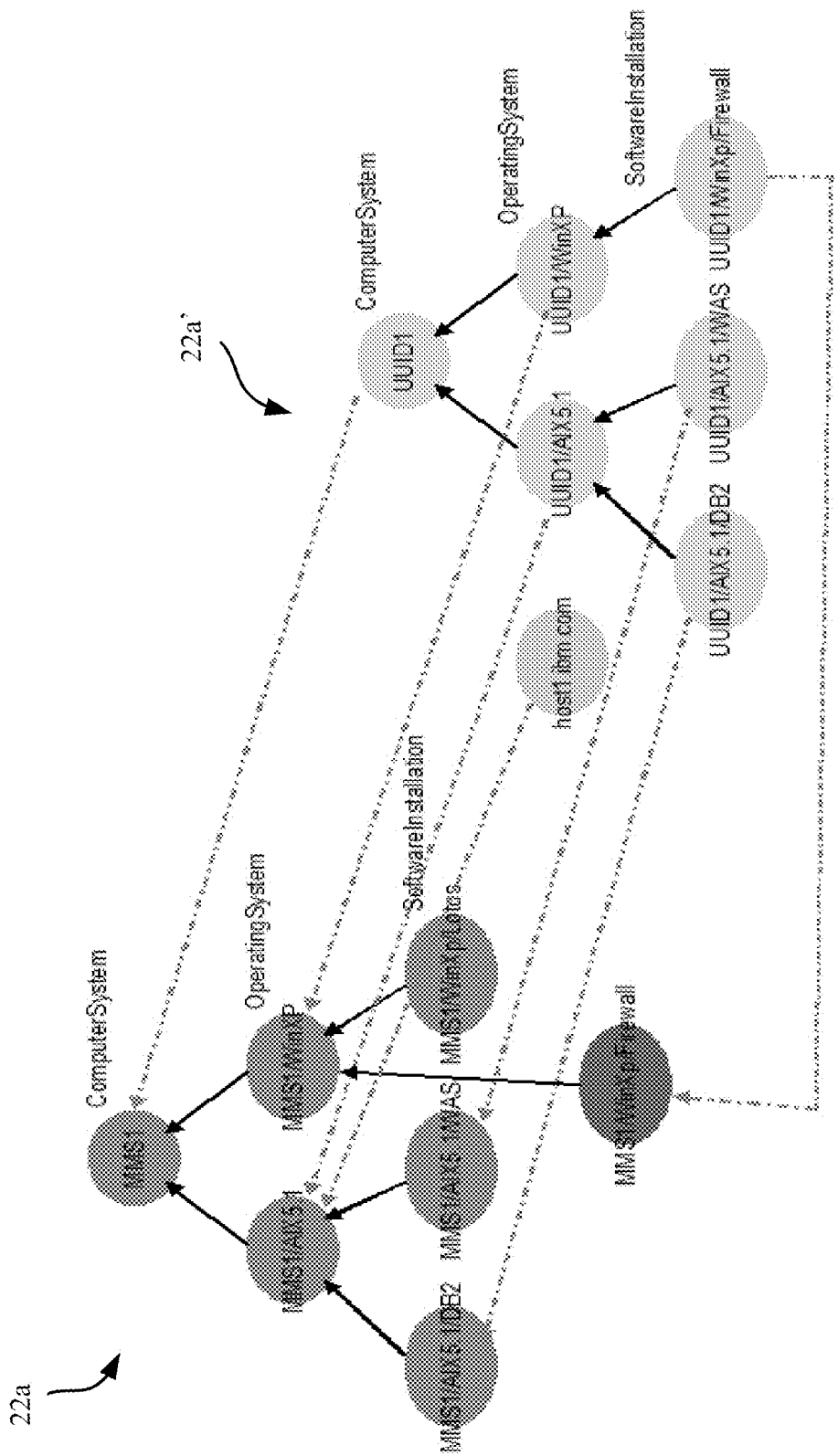
FIG. 4 is a diagram of convergence for the identity issue tree of FIG. 3 in accordance with an embodiment of the invention.

As shown in FIG. 3, one management product discovers a computer system and its dependents and uses the system board Universally Unique Identifier ("UUID") identifying attribute to provide a naming rule, while another management product discovers the same computer system and its dependents, but uses the Manufacturer, Model, and SerialNumber identifying attributes to provide a naming rule. Two separate computer systems 12a-12z have been registered and each has its own dependents. Then, a third management product discovers the same computer system and is able to obtain its system board UUID and MMS. This new discovery provides information that matches both. One of the computer system's names will be selected as the new master name and the other will become its alias name. As shown in FIG. 4, the computer system with MMS is the new master name, and the computer system with the system board UUID becomes its alias name. The identities of all the dependents of computer system UUID1 will be changed during the converge.

Both FIGS. 3 and 4 have used the convention that in CDM, a name is in Uniform Resource Identifier ("URI") format. However, in these figures, a name is abbreviated as MMS to represent a name using the naming rule of Manufacturer, Model and SerialNumber, and UUID to represent a name using the naming rule of system board UUID. Further, a black solid line and xxxx/yyyy/zzzz type format indicates the naming hierarchy. For example, MMS1/AIX/5.1/DB2 indicates that DB2 has a naming context AIX5.1 which has a naming context MMS1. In addition, the dotted line indicates a master and alias relationship. For example, host1.ibm.com >UUID/AIX 5.1 indicates that host1.ibm.com is an alias of UUID/AIX5.1.

In this example, only two duplicate resource sub-graphs are shown. However, in the real world, there could be N duplicates, where N is the number of naming rules of a class. Also, duplicate detection may occur on the top level of a graph or at any level of a graph (such as the operating system level in the examples). As a result, the system 10 describes the technique the controller 16a, e.g. NRS, uses to merge duplicate resource sub-graphs of any depth and at any level.

In an embodiment, NRS saves and uses the naming context of each name and traverse down through the naming hierarchy and converges the duplicate entries. The following diagram illustrates an example of this convergence. Notice how the lower levels of the sub-graph are the "dependents", using the naming context of the top of the sub-graph. Each one becomes an alias of the new converged sub-graph. Note: In FIG. 3, host1.ibm.com is an alias of UUID/AIX 5.1. After converge, it and UUID/AIX5.1 all become the aliases of the new master MMS1/AIX5.1.

In an embodiment, table 20 is important to the NRS, e.g. controller 16a-16z, name reconciliation process. Table 20 is used to maintain and correlate all the name instances of a resource, e.g. data processing system 12a-12z. In other words, table 20 keeps the information about each name instance of a resource such as the naming rule, the alias name, the master name, and/or the like. For a master name instance, the alias and the master name are the same, e.g. an alias is its own master.

In an embodiment, table 20 maintains the immediate naming context of each name instance. A name instance can have zero to many naming contexts. In an embodiment, the naming context kept in table 20 enables NRS, e.g. controllers 16a-16z, to locate all the name instances affected by a naming context change. For example, a CDM naming rule has defined the naming context of a software installation that is an operating system, and of an operating system that is a computer system. When NRS detects that the two computer systems that exist in NRS were the same computer system, system 10 makes one of the computer systems the master, and the other its alias. In an embodiment, all the operating system and software installation instances named after the alias computer system are changed to use the new master computer system.

In an embodiment, NRS, e.g. controllers 16a-16z, uses the naming context information stored in table 20 to build a tree 22a-22z of identified effected name instances thereby enabling system 10 the opportunity to fix such.

In an embodiment, two URI name strings based on the naming rules are generated, which each match a separate master record (node in the graph). There could be up to N matching masters (nodes), where N is the number of Naming Rules for the class. The N matching nodes are merged (two in this case), for instance.

In an embodiment, system 10 determines which of the N matching nodes will become the prevailing entry (or new master). Further, this can be a policy-based or configurable choice and can be based upon the highest priority naming rule, the largest number of sub-graph entries, the earliest or latest timestamp, other heuristics, and/or the like.

For example, NRS, e.g. controllers 16a-16z, uses the highest priority naming rule to select the prevailing entry (or new Master). For each non-prevailing, matching node, system 10 uses the information stored in the table 20 to recurse through the sub-graph and repeat the merge process (in this example, merge the OS entries, and then the software installations).

In an embodiment, if the set of immediate children of nodes being merged is different, then system 10 determines the technique for merging the set and their edges as described as follows. For intersecting children, system 10 converts the non-prevailing node master entry to an alias entry pointing to the prevailing node master entry as the "new" master. This allows input sources that originally put such there to continue to find it with the same set of identifying attributes as well as the globally unique identifier ("GUID") generated as the previous master. Further, system 10 changes the non-prevailing node alias entries to point to the prevailing node master entry. For example, in FIG. 4, host1.ibm.com is changed to point to MMSVAIX 5.1.

In addition, for the remaining non-prevailing children nodes, system 10 adds a new master entry based on the prevailing parent node naming context, and converts non-prevailing children nodes for an alias entry pointing to the new master entry. In FIG. 4, UUID1 has a Firewall, but MMS1 does not. A new entry MMS1/WinXP/Firewall is created and UUID1/WinXP/Firewall is the alias of this new entry, which greatly reduces the chance that no new duplicates will be mistakenly created after the converge.

In an embodiment, system 10 records the "old" and "new" master GUID's persistently for the converted non-prevailing node master entry. This enables consuming applications to check for re-identification of nodes and to handle such in their own data stores. Using FIGS. 3 and 4 as an example, the following duplicate entries will be recorded in table 20 of FIG. 5.

As will be appreciated by one skilled in the art, embodiments of the invention may be embodied as a system, method or computer program product. Accordingly, embodiments of the invention may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the invention has been described, it will be understood that those skilled in the art, both now and in the future, may make various improvements and enhancements which fall within the scope of the claims which follow. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to explain the principles of the invention and the practical application, and to enable others of ordinary skill in the art to understand the invention for various embodiments with various modifications as are suited to the particular use contemplated.

While embodiments of the invention have been described, it will be understood that those skilled in the art, both now and in the future, may make various improvements and enhancements which fall within the scope of the claims which follow.

What is claimed is:

1. A system comprising:
a plurality of data processing systems;
a network connecting the plurality of data processing systems; and
a controller configured to manage the plurality of data processing systems by resolving naming conflicts for each of the plurality of data processing systems on the network to a respective master name while also maintaining the alias names for each of the plurality of data processing systems on the network.

2. The system of claim 1 wherein the controller determines each respective master name and any alias name for each of the plurality of data processing systems on the network.

3. The system of claim 1 wherein the controller distributes each respective master name for each of the plurality of data processing systems on the network to the other data processing systems on the network.

4. The system of claim 1 wherein the controller resolves the naming conflict by correlating all names for each of the plurality of data processing systems on the network into a table.

5. The system of claim 4 wherein the controller uses the table to build a tree to converge naming conflicts into each respective master name for each of the plurality of data processing systems on the network.

6. The system of claim 4 wherein the table comprises at least one of naming rule, alias name, and master name.

7. The system of claim 1 wherein the controller comprises a plurality of controllers.

8. The system of claim 7 wherein information from the plurality of controllers are cross-referenced to determine the respective master name for each of the plurality of data processing systems on the network.

9. The system of claim 1 wherein the controller selects the respective master name based upon at least one of a policy choice and configurable choice.

10. A method comprising:
managing a plurality of data processing systems on a network by resolving naming conflicts for each of the plurality of data processing systems on the network to a respective master name via an automated system; and maintaining the alias names for each of the plurality of data processing systems on the network.

11. The method of claim 10 further comprising determining each respective master name and any alias name for each of the plurality of data processing systems on the network.

12. The method of claim 10 further comprising resolving the naming conflict by correlating all names for each of the plurality of data processing systems on the network into a table.

13. The method of claim 12 further comprising using the table to build a tree to converge naming conflicts into each respective master name for each of the plurality of data processing systems on the network.

14. The method of claim 10 further comprising distributing the respective master name for each of the plurality of data processing systems on the network to the other data processing systems on the network.

15. The method of claim 10 further comprising cross-referencing information from throughout the automated system to determine the respective master name for each of the plurality of data processing systems on the network.

16. The method of claim 10 further comprising selecting the respective master name based upon at least one of a policy choice and configurable choice.

17. A system comprising:
a plurality of data processing systems;
a network connecting the plurality of data processing systems; and
a controller configured to manage the plurality of data processing systems by resolving naming conflicts for each of the plurality of data processing systems on the network to a respective master name based upon at least one of a policy choice and configurable choice while also maintaining the alias names for each of the plurality of data processing systems on the network, and the controller resolves the naming conflict by correlating all names for each of the plurality of data processing systems on the network into a table.

18. The system of claim 17 wherein the controller determines each respective master name and any alias name for each of the plurality of data processing systems on the network.

19. The system of claim 17 wherein the controller uses the table to build a tree to converge naming conflicts into each respective master name for each of the plurality of data processing systems on the network.

20. The system of claim 17 wherein the controller distributes the respective master name for each of the plurality of data processing systems on the network to the other data processing systems on the network.

21. The system of claim 17 wherein the table comprises at least one of naming rule, alias name, and master name.

22. The system of claim 17 wherein the controller comprises a plurality of controllers.

23. The system of claim 22 wherein information from the plurality of controllers are cross-referenced to determine the respective master name for each of the plurality of data processing systems on the network.

24. A system comprising:
a plurality of data processing systems;
a network connecting the plurality of data processing systems; and
a controller configured to manage the plurality of data processing systems by resolving naming conflicts for each of the plurality of data processing systems on the network to a respective master name based upon at least one of a policy choice and configurable choice while also maintaining the alias names for each of the plurality of data processing systems on the network, the controller determines each respective master name and any alias name for each of the plurality of data processing systems on the network, the controller distributes the respective master name for each of the plurality of data processing systems on the network to the other data processing systems on the network, and the controller resolves the naming conflict by correlating all names for each of the plurality of data processing systems on the network into a table.

25. The system of claim 24 wherein the controller uses the table to build a tree to converge naming conflicts into each respective master name for each of the plurality of data processing systems on the network.

* * * * *